Sept. 12, 1967 R. W. DRONSUTH 3,341,777
AMPLIFIER SYSTEM WITH CIRCUIT FOR REDUCING INTERMODULATION BETWEEN TRANSMITTERS
Filed Aug. 4, 1964 2 Sheets-Sheet 1

INVENTOR.
RICHARD W. DRONSUTH
BY
Mueller & Aichele
Attys.

Sept. 12, 1967 R. W. DRONSUTH 3,341,777

AMPLIFIER SYSTEM WITH CIRCUIT FOR REDUCING INTERMODULATION BETWEEN TRANSMITTERS

Filed Aug. 4, 1964 2 Sheets-Sheet 2

Inventor
RICHARD W. DRONSUTH

BY Mueller & Aichele

Attys.

United States Patent Office 3,341,777

Patented Sept. 12, 1967

3,341,777

AMPLIFIER SYSTEM WITH CIRCUIT FOR REDUCING INTERMODULATION BETWEEN TRANSMITTERS

Richard W. Dronsuth, Westchester, Ill., assignor to Motorola, Inc., Franklin Park, Ill., a corporation of Illinois Filed Aug. 4, 1964, Ser. No. 387,446
6 Claims. (Cl. 325—159)

This invention relates to power output circuits for radio transmitters, and more particularly to such an output circuit wherein intermodulation resulting from the transmitted signals and signals from other transmitters is reduced.

In radio systems wherein a plurality of signals on closely related frequencies are transmitted by transmitters in close proximity to each other, the signal from one transmitter may enter the output stage of another transmitter and cause the generation of intermodulation products. These intermodulation products may include strong signals at the frequency of one transmitter in the system, so that they will be accepted by receivers tuned to the frequency of this transmitter. These signals may be strong enough to interfere with the desired signals to prevent satisfactory system performance. Although arrangements have been used to reduce or eliminate the intermodulation products, these have not been entirely satisfactory, particularly in the situation set forth above.

It is, therefore, an object of the present invention to provide a transmitter output circuit wherein intermodulation products resulting from the introduction of signals from other transmitters are substantially reduced.

Another object of the invention is to provide a transmitter output circuit including an electron device wherein coupling between the input and output electrodes of the device is neutralized and intermodulation resulting from the introduction into the transmitters of signals from adjacent transmitters is reduced.

A feature of the invention is the provision of a transmitter output stage having tuned input and output circuits and with a probe coupled to the output electrode and connected through a phase shift network to the input electrode to reduce intermodulation components.

Another feature of the invention is the provision of a transmitter output stage including an electron device with tuned input and output circuits, wherein the output circuit is over-coupled and signals from the output electrode are applied to the input electrode through a phase shifting network to neutralize the signal coupled from the output to the input electrode within the tube, and to reduce intermodulation resulting from signals entering the circuit from the transmitting antenna. The output circuit may be a push-pull circuit and the tuned input and output circuits may include transmission lines.

The invention is illustrated in the drawings wherein.

In practicing the invention an amplifier circuit is provided for use as the output stage of a transmitter which operates in a system wherein a plurality of closely spaced transmitters produce signals on closely related frequencies. The output stage is operated in a nonlinear class C mode and has tuned input and output circuits. The stage operates at high frequency and the input and output circuits may include transmission line tuning elements. In order to reduce intermodulation products produced by signals from other transmitters entering the output stage of a particular transmitter, a capacity probe is coupled to the output electrode of the electron device and connected through a phase shift network to the input thereof. The electron device used may be a vacuum tube of the tetrode type with the capacity probe coupled to the plate connector thereof. The phase shift network may include sections with inductors, capacitors and resistors to provide a signal of advanced phase on the input electrode or grid of the tube. The capacity within the tube applies a signal from the plate to the grid of the tube which leads the plate signal by approximately 90°. The signal applied to the grid through the phase shifting network includes one quadrature component which balances out the component coupled within the tube to neutralize the effect of the interelectrode capacity of the tube. This signal has another component which is out of phase with the input voltage applied to the grid and this acts to cancel out or reduce intermodulation resulting from signals from other transmitters combining in the output stage with the desired signal. The tuned output circuit may be over-coupled so that variations in plate potential produce a minimum change in current, which also acts to reduce the effect of intermodulation from external signals.

Figure 1:
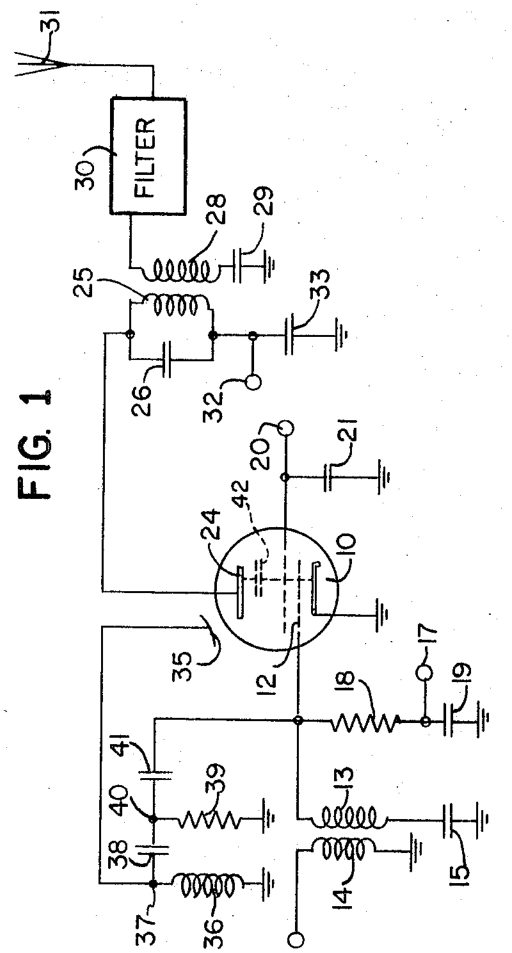
FIG. 1 illustrates the transmitter output circuit of the invention.

Referring now to the drawing, in FIG. 1 there is shown the transmitter power amplifier circuit of the invention including tetrode tube 10. Input signals are applied to the grid 12 of the tube through the circuit including coil 13 to which signals are coupled by primary winding 14. The input circuit is tuned by capacitor 15 which is connected in series with coil 13. Bias potential is applied to the grid 12 from terminal 17 through resistor 18, with the bias potential being bypassed by capacitor 19. The screen grid of the tube is connected to a positive potential at terminal 20, and is bypassed by capacitor 21. The plate 24 of the tube is coupled to a tuned output circuit including coil 25 and variable capacitor 26. Signals are picked up from coil 25 by secondary winding 28, which is tuned by capacitor 29. The output circuit may be over-coupled for a reason to be explained. The output signal is applied through harmonic filter 30 to antenna 31. Positive potential is applied to the anode 24 of the tube from terminal 32, being bypassed by capacitor 33. The stage operates as a class C amplifier.

A probe 35 is capacity coupled to the anode 24 of the tube, and picks up signals therefrom. The capacity coupled signals are applied across inductor 36 which is connected to ground, so that the signals appearing at point 37 are advanced with respect to the signals at the anode 24 by approximately 180°. These signals are applied through capacitor 38 and across resistor 39 so that the signals at point 40 are further advanced in phase. The signals are again advanced in phase by action of capacitor 41 and the resistive path connected to the grid 12, so that the signals applied through the capacity coupling from the plate 24 to the probe 35 and through the phase shifting network including coil 36, capacitor 38, resistor 39 and capacitor 41 are advanced in phase more than 270° when applied to the grid 12.

Figure 2:
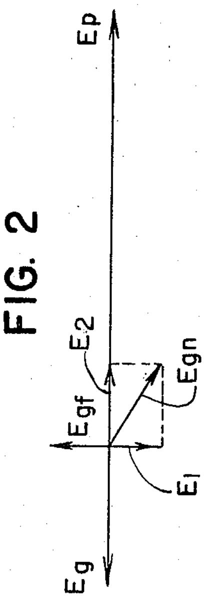
FIG. 2 is a vector diagram illustrating the operation of the circuit of FIG. 1.

The action of the tube with the circuits coupled thereto is illustrated by the vector diagram of FIG. 2. The signal applied from the tuned input circuit to the grid 12 is represented by the voltage $E_g$. This produces a larger plate voltage which is 180° out of phase as represented by the voltage $E_p$. The capacity coupling within the tube between the plate 24 and the grid 12, indicated as 42, produces a voltage on the grid which is advanced 90° with respect to the plate voltage. This is represented in FIG. 2 by the voltage $E_{gf}$. The voltage provided from the plate 24 to the probe 35, and coupled to the grid 12 through the phase shifting network including coil 36, capacitor 38, resistor 39 and capacitor 41 is represented by the vector $E_{gn}$. This voltage is shown advanced approximately 330° with respect to the plate voltage. The coupling of the probe and the design of the phase shift network are such that the voltage $E_{gn}$ includes a component $E_1$ which is of the same amplitude as the voltage $E_{gf}$ and of opposite phase, to balance out this voltage. This effectively neutralizes the internal capacity of the tube. The voltage $E_{gn}$ has a second quadrature component $E_2$ which is 180° out of phase with the input voltage $E_g$ and substantially in phase with the output voltage $E_p$. This voltage produces a voltage at the plate which is 180° out of phase with the plate voltage $E_p$ and acts to cancel out intermodulation products developed in the output circuit.

Figures 3, 4:
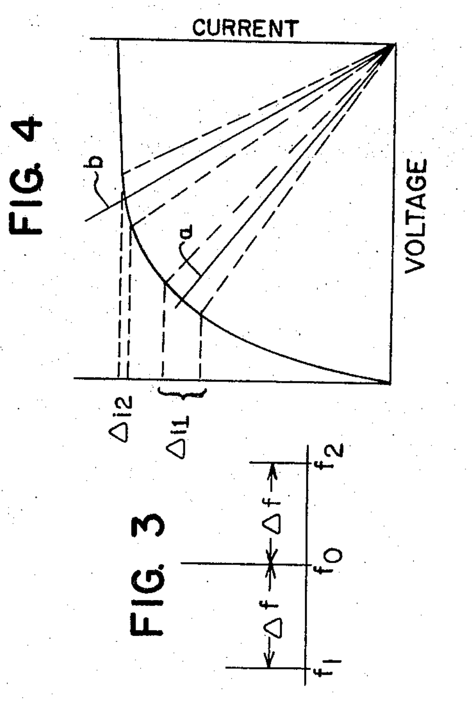
FIG. 3 illustrates the intermodulation signals produced in the circuit of FIG. 1.
FIG. 4 illustrates the change in current resulting from a change in voltage of the transmitter output circuit.

FIG. 3 illustrates the objectionable intermodulation products which may be produced in the circuit of FIG. 1. As previously stated, the transmitter may be used in a system wherein a plurality of transmitters have antennas closely spaced physically and operating on closely spaced frequencies. One such application is in mobile telephone systems wherein a plurality of transmitters are used to provide a plurality of channels, any one of which may be used by mobile stations. In such case, signals from other transmitters are coupled to the output stage of each transmitter through the adjacent antennas.

In FIG. 3, the signal from the transmitter being considered is at frequency $f_0$, and other transmitters are operating at frequencies spaced $\Delta f$ from the frequency $f_0$. The signal from another transmitter which enters through the antenna to the output stage of the first transmitter may be at frequency $f_1$. Although the amplitude of this signal is less than the amplitude of the signal transmitted, because of the physical spacing of the antennas this signal can be relatively large. As is well known, the transmitter circuits, which are non-linear, will cause the signals $f_0$ and $f_1$ to mix to produce a plurality of intermodulation signals, the strongest of which is a frequency $f_2$, and is spaced from the frequency $f_0$ by the frequency $\Delta f$. This frequency may be the frequency on which a third transmitter of the system is operating, so that receivers will be tuned to this frequency. Accordingly, strong intermodulation signals appearing at frequency $f_2$ will cause objectionable disturbances which may prevent satisfactory reception of signals on this frequency.

The intermodulation takes place in the plate circuit of the tube because the tube is non-linear. As previously stated, the voltage at the plate, including the intermodulation signal, is coupled to the grid through the phase shift network. The intermodulation signal applied to the grid is of the proper phase to reduce the strength of the intermodulation signal at the plate.

As has been mentioned, the output circuit of the transmitter power output stage may be over-coupled, and this is effective to reduce the effect of intermodulation resulting from signals applied from adjacent transmitters. Over-coupling of the output circuit reduces the effective impedance of the output circuit so that less of the interfering signal $f_1$ is coupled in, and also reduces the change in current resulting from the signal coupled in.

The effect of over-coupling is illustrated in FIG. 4 which shows the change in current in the output circuit of the stage for a change in plate voltage of the tube 10. The line *a* of FIG. 4 represents the load line produced by normal coupling with the dotted lines on either side thereof representing the voltage swing produced when signals from other stations are applied to the output circuit. It will be noted that this results in a change in current $\Delta i_1$ in the output circuit which is relatively large. Line *b* represents the load line produced by over-coupling, and this shifts the active area to a position so that the swing of voltage produces a change in output current which is much less. Accordingly, when the voltage swings between the dotted lines on either side of the load line *b* resulting from signals from other transmitters entering the output circuit, the output current varies only through the range $\Delta i_2$. Therefore, the signals from adjacent transmitters have less effect on the output current, with the result that the intermodulation products are reduced.

If the output circuit was linear, the change in voltage therein produced by the signals entering from other transmitters would not cause intermodulation, and the change in current resulting therefrom would not be objectionable. However, because of the nonlinear characteristics of the circuit, the change in voltage caused by the incoming signals produces intermodulation, and this is represented in the change in current. The action of over-coupling, to hold the change in current down, cooperates with the action of the phase shifting network to reduce the effect of the intermodulation.

Figure 5:
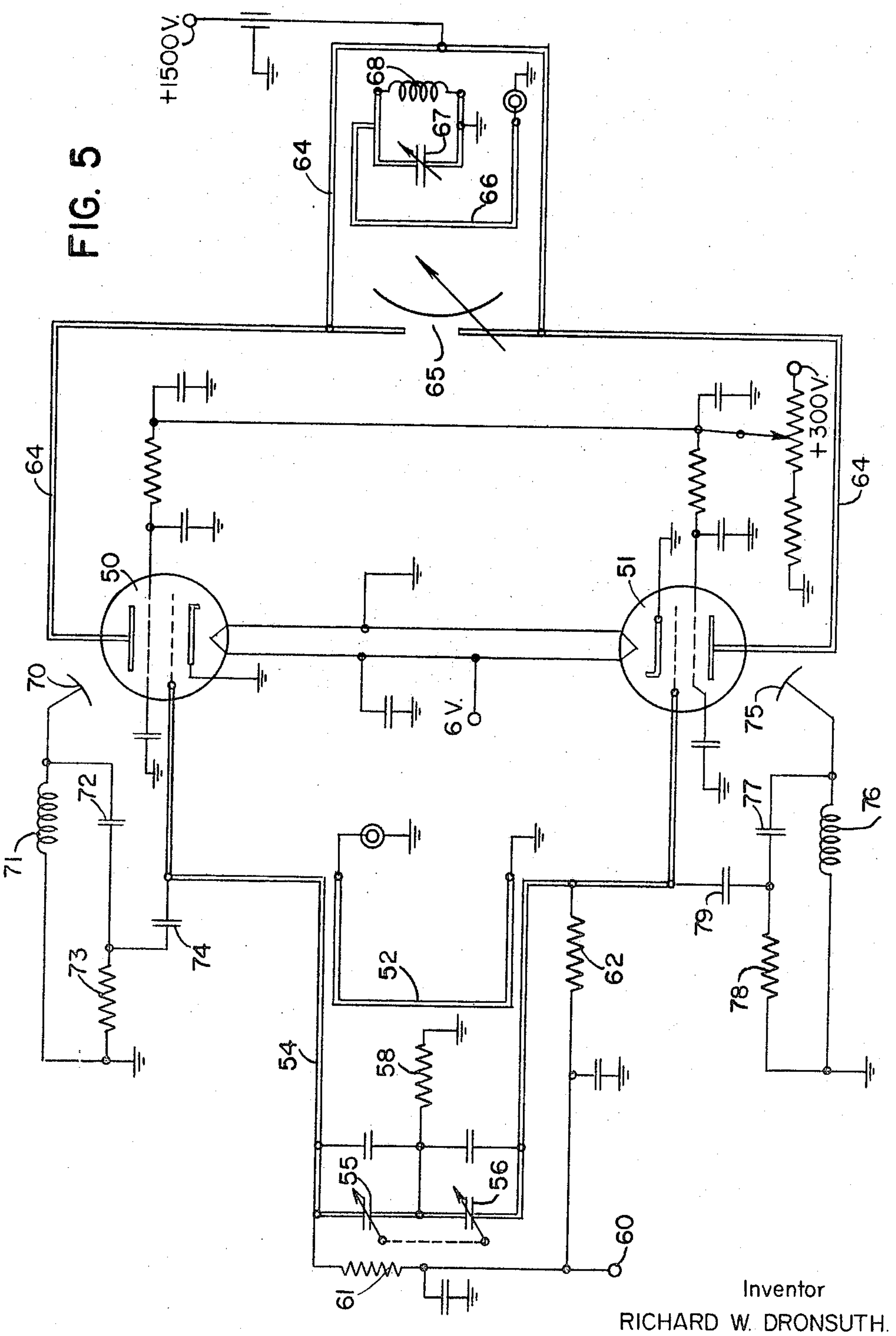
FIG. 5 illustrates a push-pull transmitter output circuit in accordance with the invention.

FIG. 5 illustrates a circuit generally similar to that of FIG. 1 but this is a push-pull or balanced circuit. The tetrode tubes 50 and 51 may be type 4CX250 tubes which are commercially available. Input signals are applied from coupling loop 52 through the input line 54 connected to the grids of the tubes 50 and 51. The line is balanced and tuned by capacitors 55 and 56, the center connection of which is connected through resistor 58 to ground. Bias is provided to the grid from terminal 60 through resistors 61 and 62 coupled to the grids of tubes 50 and 51, respectively. The plates of the tubes 50 and 51 are connected to tuned line 64, which is tuned by capacitor 65. Output signals are derived from coupling loop 66 which is tuned by capacitor 67 and coil 68.

Probe 70 is capacity coupled to the plate of tube 50, and is connected to the grid of the tube 50 through the phase shift circuit including inductor 71, capacitor 72, resistor 73 and capacitor 74. Similarly, probe 75 is capacity coupled to the anode of tube 51, and is connected through phase shift circuit including inductor 76, capacitor 77, resistor 78 and capacitor 79 to the grid of tube 51.

The operation of the circuit of FIG. 5 is generally the same as that of FIG. 1, and is illustrated by the diagrams of FIGS. 2, 3 and 4. The signal derived from the plate of each tube and coupled to the grid thereof through the phase shifting network has a first quadrature component for cancelling the signal coupled between the plate and grid of the tube through the interelectrode capacity, and a second quadrature component in phase with the signal in the plate circuit, which when applied to the grid acts to reduce intermodulation components developed in the plate circuit. The action of the phase shifting network cooperates with over-coupling of the output circuit to reduce the intermodulation produced by signals entering the circuit from other transmitters.

The transmitter output circuits as described have been found to be highly effective to reduce intermodulation in a transmitter operating in close proximity to other transmitters providing signals on adjacent frequencies. As the signals are at frequencies closely spaced to the transmitted signal, they are admitted into the output circuit with relatively small attenuation. Because of the non-linear characteristics of the output current of the power amplifier, the signal to be transmitted and the signals received into the output circuit combine to provide relatively strong intermodulation products. These products may include signals either on the frequency of other transmitters or closely adjacent thereto, so that they will be accepted by receivers of the system. The circuit of the invention reduces these products by a substantial amount to thereby provide greatly improved operation.

I claim:

1. A class-C amplifier stage including in combination, an electron device having grid and plate electrodes, means applying an input signal to said grid electrode so that an amplified output signal of opposite phase and increased amplitude is developed at said plate electrode, output circuit means coupled to said plate electrode and including an over-coupled circuit portion, said output circuits means having interfering signals applied thereto which tend to produce intermodulation products at said plate electrode, said device having internal capacitance between said grid and plate electrodes whereby the signal at said plate electrode is coupled to said grid electrode, electrode means capacity coupled to said plate electrode for deriving said output signal therefrom, and phase shift means coupling said electrode means to said grid electrode, said electrode means and said phase shift means cooperating to provide a signal at said grid electrode which has a first quadrature component of substantially the same amplitude and in phase opposition to the signal applied from said output electrode to said grid electrode through the internal capacitance of said electron device and a second quadrature component substantially in phase with the signal at said plate electrode to reduce intermodulation products developed at said plate electrode.

2. A class-C amplifier stage including in combination, an electron device having grid and plate electrodes, tuned input and output circuit means coupled to said grid and plate electrodes respectively, said input circuit means applying an input signal to said grid electrode whereby an amplified output signal of opposite phase and increased amplitude is developed at said plate electrode, said electron device having internal capacitance between said grid and plate electrodes through which the signal at said plate electrode is coupled to said input electrode with reduced amplitude and advanced in phase by substantially 90°, electrode means capacity coupled to said plate electrode electrode for deriving said output signal signal therefrom, and phase shift means coupling said electrode means to said grid electrode and advancing the phase of said output signal by an angle greater than 270°, said electrode means and said phase shift means cooperating to provide a signal at said grid electrode which has a first quadrature component of substantially the same amplitude and in phase opposition to the signal applied to said grid electrode through the internal capacitance of said electron device and a second quadrature component in phase opposition to the input signal applied to said grid electrode.

3. A class-C amplifier circuit for a radio transmitter including in combination, an electron device having grid and plate electrodes, tuned input and output circuit means coupled to said grid and plate electrodes respectively, said input circuit means applying an input signal to said electrode whereby an amplified output signal of opposite phase and increased amplitude is developed at said plate electrode, antenna means connected to said output circuit means, said output circuit means including an over-coupled circuit, said electron device having internal capacitance between said electrodes through which the signal at said plate electrode is coupled to said grid electrode with reduced amplitude and advanced in phase by substantially 90°, electrode means capacity coupled to said plate electrode for deriving said output signal therefrom, and phase shift means coupling said electrode means to said grid electrode and advancing the phase of said output signal by an angle greater than 270°, said electrode means and said phase shift means cooperating to provide a signal at said grid electrode which has a first quadrature component of substantially the same amplitude and in phase opposition to the signal applied to said grid electrode through the internal capacitance of said electron device and a second quadrature component in phase opposition to the input signal applied by said input circuit means to said grid electrode.

4. In a radio system having a plurality of transmitters operating on closely adjacent frequencies and having antennas positioned to receive signals from each other, a class-C amplifier stage for a radio transmitter including in combination, an electron device having input and output electrodes, tuned input and output circuit means coupled to said input and output electrodes respectively, said input circuit means applying an input signal to said input electrode whereby an amplified output signal of opposite phase and increased amplitude is developed at said output electrode, said output circuit means being connected to the antenna of the transmitter for radiating signals therefrom with the antenna applying signals from another transmitter to said output circuit means, said output circuit means including an over-coupled circuit providing a load for said electron device so that the change in current produced by a change in voltage across said output circuit means is reduced, said electron device having internal capacitance between said electrodes through which the signal at said output electrode is coupled to said input electrode, electrode means capacity coupled to said output electrode for deriving said output signal therefrom, and phase shift means coupling said electrode means to said input electrode, said electrode means and said phase shift means cooperating to provide a signal at said input electrode which has a first quadrature component of substantially the same amplitude and in phase opposition to the signal applied to said input electrode through the internal capacitance of said electron device and a second quadrature component substantially in phase with the signal in said output circuit means to reduce intermodulation products at said output electrode resulting from signals from other transmitters applied to said output circuit means by said antenna means.

5. The structure of claim 4 wherein said electron device is a vacuum tube having grid and plate electrodes forming said input and output electrodes respectively, and wherein the signal coupled through the internal capacitance is advanced in phase by substantially 90° at said grid electrode, with said phase shift means being constructed to advance the signal applied to said grid electrode by an angle greater than 270°.

6. The structure of claim 4 wherein said amplifier stage includes a second electron device having input and output electrodes, and wherein said tuned input and output circuit means are connected to said input and output electrodes of said second electron device to form a push-pull circuit, and including second electrode means coupled to said output electrode of said second electron device and second phase shift means coupling said second electrode means to said input electrode of said second electron device for providing a signal thereat having a first quadrature component in phase opposition to the signal applied through the internal capacitance of said second electron device and a second quadrature component for reducing intermodulation products at said output electrode of said second electron device.

References Cited

UNITED STATES PATENTS

| | | | |
|---|---|---|---|
| 1,597,420 | 8/1926 | Austin | 325—124 X |
| 2,548,770 | 4/1951 | Caraway | 330—77 |
| 2,912,570 | 11/1959 | Holzwarth et al. | 325—159 X |
| 3,204,194 | 8/1965 | Steel et al. | 325—159 X |
| 3,217,266 | 11/1965 | Pintell | 330—77 |

JOHN W. CALDWELL, *Acting Primary Examiner.*